United States Patent [19]
Dole

[11] Patent Number: 5,813,705
[45] Date of Patent: Sep. 29, 1998

[54] SNAP-ACTION PIPE COUPLING RETAINER

[75] Inventor: Douglas R. Dole, Whitehouse Station, N.J.

[73] Assignee: Victaulic Company of America, Easton, Pa.

[21] Appl. No.: 665,477

[22] Filed: Jun. 18, 1996

[51] Int. Cl.[6] ............................ F16L 37/14; F16L 21/08
[52] U.S. Cl. ...................... 285/321; 285/305; 285/340
[58] Field of Search .................................. 285/305, 340, 285/104, 308, 321; 403/14, 318, 326

[56] References Cited

U.S. PATENT DOCUMENTS

| | | | |
|---|---|---|---|
| 1,995,006 | 3/1935 | Mueller et al. | 285/321 |
| 2,005,174 | 6/1935 | Williams | 247/27 |
| 2,458,714 | 1/1949 | Mahoney | 285/97.3 |
| 2,597,482 | 5/1952 | Harrison et al. | 285/97.3 |
| 2,785,910 | 3/1957 | Munger | 285/305 |
| 2,831,711 | 4/1958 | Leadbetter | 285/238 |
| 2,950,132 | 8/1960 | Kocsuta | 285/340 |
| 3,181,897 | 5/1965 | Krayenbuhl et al. | 285/305 |
| 3,334,929 | 8/1967 | Wiltse | 285/305 |
| 3,389,923 | 6/1968 | Love et al. | 285/321 |
| 3,422,630 | 1/1969 | Marier | 61/53 |
| 3,606,402 | 9/1971 | Medney | 285/305 |
| 3,822,074 | 7/1974 | Welcker | 285/305 |
| 4,072,328 | 2/1978 | Elliott | 285/340 |
| 4,105,226 | 8/1978 | Frey et al. | 285/319 |
| 4,111,464 | 9/1978 | Asano et al. | 285/111 |
| 4,181,329 | 1/1980 | Helm | 285/340 |
| 4,269,436 | 5/1981 | Medney | 285/305 |
| 4,293,148 | 10/1981 | Milberger | 285/305 |
| 4,396,210 | 8/1983 | Spencer, III et al. | 285/305 |
| 4,697,947 | 10/1987 | Bauer et al. | 403/14 |
| 4,810,009 | 3/1989 | Legris | 285/340 |
| 4,927,192 | 5/1990 | Ungchusri et al. | 285/305 |
| 5,040,831 | 8/1991 | Lewis | 285/305 |
| 5,160,179 | 11/1992 | Takagi | 285/340 |
| 5,496,076 | 3/1996 | Lin | 285/340 |
| 5,511,826 | 4/1996 | Clare et al. | 285/5 |
| 5,603,532 | 2/1997 | Guest | 285/305 |

FOREIGN PATENT DOCUMENTS

| | | | |
|---|---|---|---|
| 654535 | 11/1964 | Belgium | 285/321 |
| 225305 | 11/1986 | European Pat. Off. . | |
| 1310712 | 10/1962 | France | 285/305 |
| 417246 | 1/1967 | Switzerland | 258/104 |
| 1277385 | 6/1972 | United Kingdom | 285/305 |
| 2034841 | 6/1980 | United Kingdom | 285/104 |
| 90/06468 | 6/1990 | WIPO | 285/321 |

*Primary Examiner*—Eric K. Nicholson
*Attorney, Agent, or Firm*—Abelman, Frayne & Schwab

[57] ABSTRACT

A pipe coupling includes a retainer having spring fingers that extend inwardly of the inner periphery of the coupling, and which are cammed outwardly by a pipe when inserted into the coupling, the spring fingers then returning to their original position under the stored spring force for them to snap into a groove in the pipe exterior, and thus provide a positive stop preventing withdrawal of the pipe axially of the coupling.

28 Claims, 3 Drawing Sheets

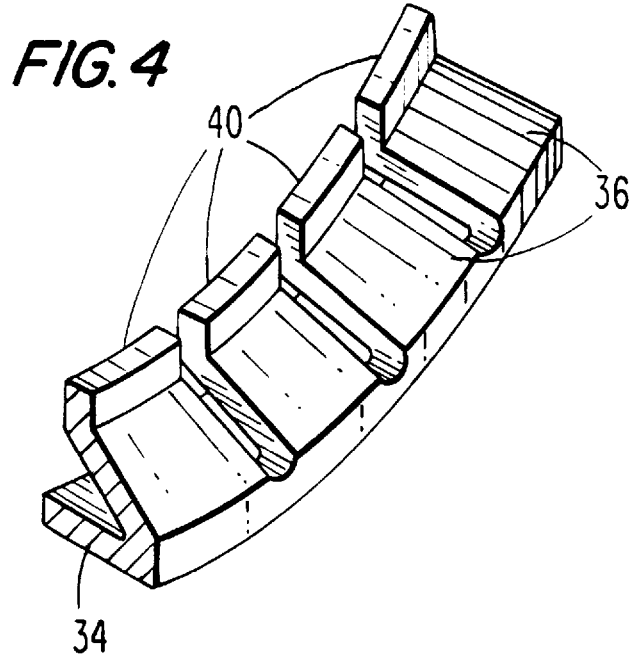
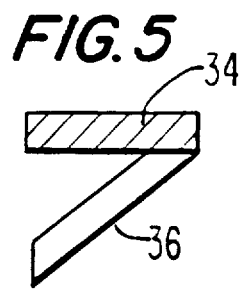
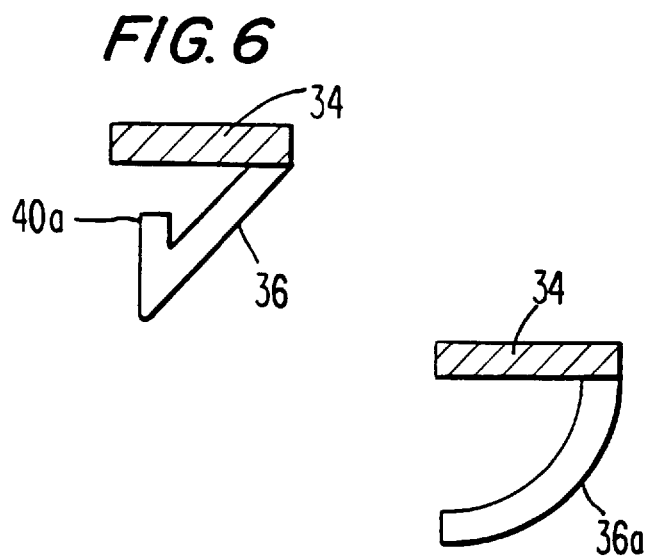

SNAP-ACTION PIPE COUPLING RETAINER

FIELD OF THE INVENTION

This invention relates to a coupling for joining together lengths of pipes, or, for attaching a fitting to a length of pipe, or, for joining fittings to each other.

BACKGROUND OF THE INVENTION

Couplings of this type are well-known in the art, a typical example being illustrated in Mahoney, U.S. Pat. No. 2,458,714 issued Jan. 11, 1949.

The coupling includes a tubular member which internally houses a sealing ring for cooperation with a pipe exterior, and a locking groove for the reception of a locking member, typically, a length of ductile wire or a coil spring, which is inserted tangentially through an opening in the coupling wall, and which extends between a groove formed in the coupling and a juxtaposed groove formed in the outer periphery of the pipe.

The problem with such couplings is that the coupling must first be assembled onto the pipe. The retaining member must then be inserted tangentially through the aperture in the coupling wall, and then pushed into encircling relation with the pipe periphery. The retaining member is in this manner properly positioned within the internal groove in the coupling and the external groove in the pipe periphery in bridging relationship therewith.

As will be readily apparent, the retaining member can only be inserted tangentially into the coupling at the time the groove in the interior of the coupling and the exterior of the pipe periphery are in correct position of axial alignment. This, in turn, demands an extremely close tolerance in the positioning of the pipe and coupling axially relative to each other for their respective grooves to be in axial alignment with each other. Commonly, a radial abutment is provided on the exterior of the pipe periphery, as taught by Mahoney in U.S. Pat. No. 2,458,714. More conveniently, the abutment can be provided internally of the coupling as a shoulder that is engaged by the pipe end when the coupling is correctly positioned over the pipe end.

It is known in the art to provide a retainer for such a coupling that can be withdrawn from the coupling in the event that it is desired to disassemble the coupling from the pipe. This is done by pulling the retainer circumferentially out of the coupling by grasping a free end of the retainer that extends out of the tangential opening in the coupling. There still remains the problem that to secure the coupling to the pipe, the coupling must be correctly assembled onto the end of the pipe, and then, and this possibly in a most inconvenient location, the retainer inserted into the coupling and then forced circumferentially within the coupling into encircling relation with the pipe groove.

SUMMARY OF THE INVENTION

The present invention seeks to overcome this problem by providing a coupling that can be pre-loaded with a retainer prior to its positioning over the pipe end, the retainer being capable of radially outward movement against a resilient bias, and then being capable of snapping into the pipe groove under the resilient bias in order to produce a permanent interconnection between the coupling and the pipe.

According to the present invention, a coupling is provided which includes a retainer that is insertable into and removable from an interior groove in the coupling through a tangentially extending aperture in the coupling communicating with the groove.

The retainer is formed from a spring material, such as spring steel or a hard plastics material that can provided spring-like characteristics, the retainer being comprised of a continuous and flexible base band, which has been formed along one of its longitudinal edges to provide spring fingers.

When inserted into the coupling, the spring fingers extend radially inwards of the coupling and terminate on a diameter less than the internal diameter of the coupling, in this way to provide a multiplicity of spring fingers each extending radially inwards of the coupling.

The spring fingers are configured as ramp cams, which upon insertion of a pipe into the coupling, are cammed in a radially outwards direction, thus permitting the entrance of the pipe into the coupling.

At the time the spring fingers become positioned in alignment with the groove in the pipe periphery, the spring fingers then snap radially inward into the pipe groove under their stored resilient bias, thus to provide a permanent interconnection between the coupling and the pipe.

The retainer can be withdrawn circumferentially from the coupling by pulling the retainer out of the coupling in a tangential direction in order to disassemble the coupling.

DESCRIPTION OF THE DRAWINGS

The invention will be more readily understood from a reading of the following specification and by reference to the following drawings forming a part thereof, and wherein:

FIG. 4 is a perspective view of a preferred form of retainer according to the present invention, and as is employed in the embodiment of FIG. 3; and FIG. 5–7 illustrate in cross-section other configurations of the retainer that meet the requirements of the present invention.

DESCRIPTION OF THE PRIOR ART

Figure 1:
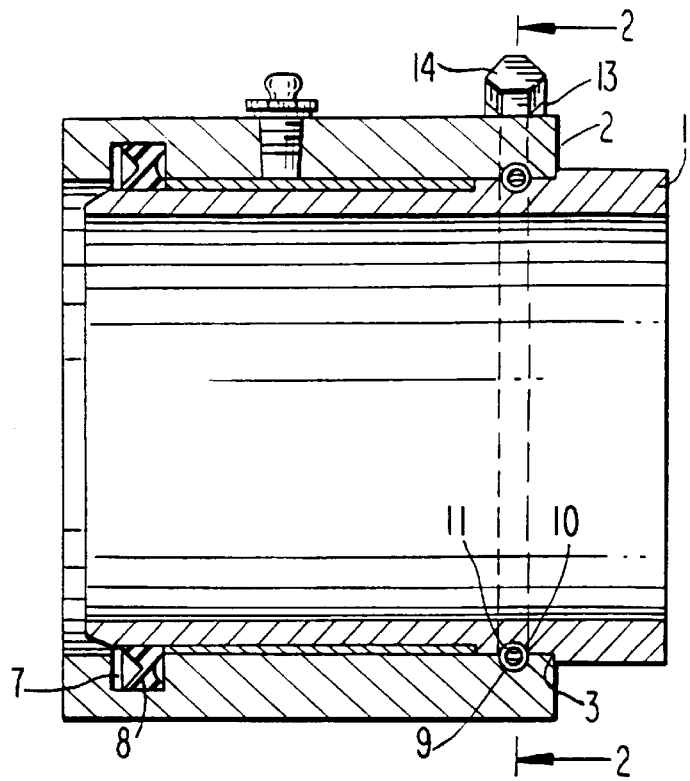
FIG. 1 illustrates the prior art coupling taught by Mahoney in U.S. Pat. No. 2,458,714.
Figure 2:
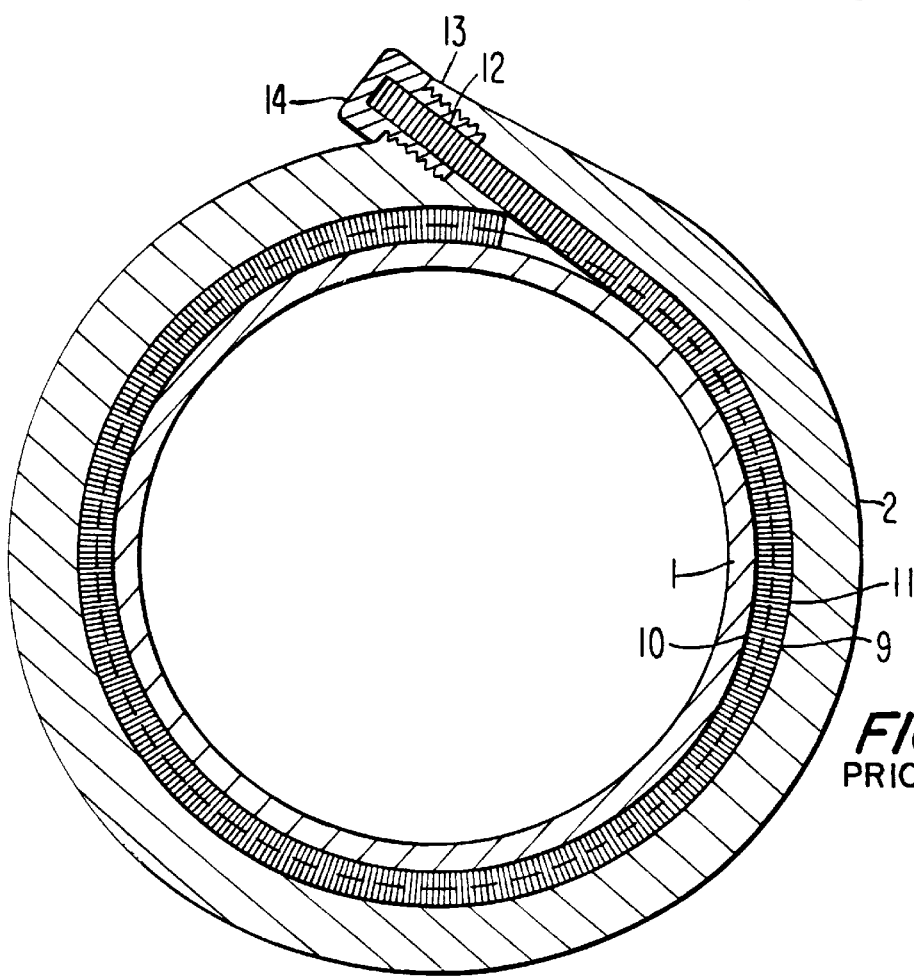
FIG. 2 is a cross-section taken on the line 2 of FIG. 1.

Referring to FIGS. 1 and 2, the prior art pipe coupling includes a tubular coupling member 2 that is sized internally for it to be received over the outer periphery of a pipe 1.

A circumferential groove 9 is provided in the interior of the coupling, and, a corresponding groove 10 is provided in the outer periphery of the pipe, in order to permit the insertion of a retainer 9 circumferentially into the coupling when the grooves 9 and 10 are in proper axial alignment.

One end 12 of the retainer extends tangentially of coupling 2, in order to permit the insertion of the retainer circumferentially into the coupling, or its withdrawal thereof circumferentially of the coupling in the event that it is desired to disassemble the coupling from the pipe.

A further internal groove 7 which is provided within the coupling houses a sealing member 8. The retainer conveniently is secured within the coupling by a cap member 14 threadedly received within an extension 13 or the coupling.

In order to assemble the coupling of the prior art, the appropriately configured pipe 1 must be inserted into the coupling 2 prior to insertion of the retainer 11, insertion of the retainer 11 demanding manual dexterity, which may be required in a location that is highly inconvenient to a workman.

DESCRIPTION OF THE PREFERRED EMBODIMENT

Figure 3:
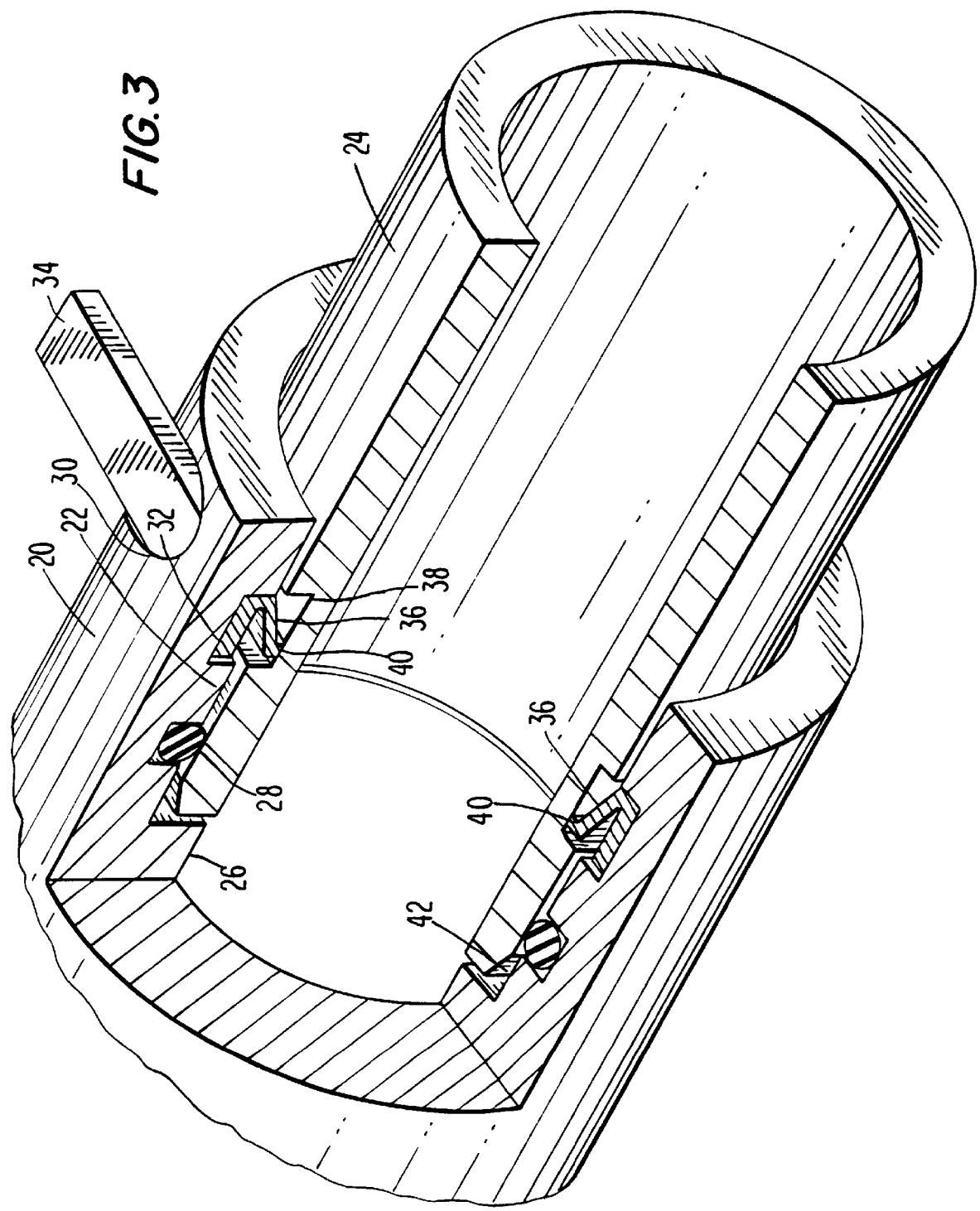
FIG. 3 is a fragmentary perspective view of a pipe coupling according to the present invention.

Referring now to FIG. 3, a coupling according to the present invention is illustrated, that coupling including body 20 having an internal bore 22 configured to accept a pipe 24, the coupling having an internal abutment 26, and also including an O-ring 28 located within an internal groove in the coupling 20.

The coupling 20 has a tangential inlet 30 into a groove 32 in the interior of the coupling 20. A retaining member 34, is inserted through the tangential opening 30, and is then fed circumferentially within the internal groove 32 in the coupling, the retainer 34 being formed of a spring-like material that expands radially outwards into seated relation with the axially extending wall of the groove 32 in the coupling 20.

Assembly of the retainer 34 into the coupling 20 is effected prior to the insertion of the pipe 24 into the coupling, i.e., the retainer 34 can be preassembled into the coupling 20 at a position entirely remote from the pipe 24, optionally at the point of manufacture of the coupling 20.

At the point of assembly of the coupling 20 onto the pipe 24, the coupling 20 can then be slid axially of the pipe 24 to provide the required interconnection of the coupling 20 with the pipe 24.

In order to permit insertion of the end of the pipe into the assembled coupling 20 and retainer 34, the retainer 34 is formed, as illustrated in FIG. 4 with serially arranged spring fingers 36, that are cammed radially outwardly within the coupling 20 by the pipe to permit the axial insertion of the pipe 24 into the coupling 20.

Upon the end of the pipe reaching the end stop 26, the respective spring fingers 36 will have become positioned in radial alignment with a groove 38 formed in the external periphery of the pipe, at which time, the spring fingers 36 are free to return to their original position under the spring force stored within the fingers 36, for the free ends of the spring fingers 36 to extend on a diameter less than the external diameter of the pipe 24. At that time, the spring fingers 36 extend into the groove 38, and are operative to prohibit axial removal of the pipe from the coupling, the spring fingers 36 then being located behind the radial side wall of the groove 38.

Preferably, the spring fingers 36 terminate at their free ends in stop members 40 that extend radially of the pipe axis, and which thus provide a positive end stop inhibiting axial movement of the coupling and pipe relative to each other.

In the event that an attempt is made to move the coupling 20 and pipe 24 relative to each other, movement in one direction is prevented by the end stops 26. Extremely limited relative movement between the coupling 20 and pipe 24 in the opposite direction possibly can occur depending on the closeness of the members 40 to the juxtaposed side wall of the groove 38. Such movement will, however, be of an extremely limited extent.

Immediately the side wall of the groove 38 has contacted the stop members 40 of the spring fingers 36, further axial movement in that direction is inhibited, any further attempt to move the coupling 20 and pipe 24 relative to each other in that direction resulting in a compressive force being exerted in the spring fingers 36 which is translated to the retainer 34, and in turn, translated into a reaction force on the side wall of the groove 32 in the coupling 20.

The retainer 34 thus acts with a snap-action permitting ready entry of the pipe 24 into the coupling 20, and, once the pipe has reached the end stop 26, then inhibits removal of the pipe 24 from the interior of the coupling.

This snap-action of the retaining member permits the coupling and pipe to be assembled to each other in any location that will permit the required axial movement of the coupling 20 and pipe 24 relative to each other. The coupling then becomes a permanent coupling until such time as the retainer 34 is withdrawn circumferentially out of the coupling 20. This readily can be accomplished, when intended, by grasping the free end of the retainer 34 with a pliers, and by then pulling the retainer 34 tangentially out of the coupling 20.

In order to provide the required camming action on the stop members 40 of the spring fingers 36, the pipe is formed with a bevel 42 at its free end. This requirement for bevelling of the free end of the pipe 24 can be eliminated by minor modification of the spring fingers 36, as now described with reference to FIGS. 5–7.

As illustrated in FIG. 5, the spring fingers 36 are devoid of end stops 40. Thus, the requirement of a bevel 42 on the pipe 24 is eliminated, the spring fingers 36 being forced radially upwards by the un-beveled end of the pipe 24 as it enters the coupling 20, and then springing back into engagement with the bottom wall of the groove 38, the fingers 36 being placed under compressive loading if any attempt is made through withdraw the pipe 24 axially from the coupling 20.

An alternative to the construction of FIG. 5 is shown in FIG. 6, in which end stops 40a are provided on the spring fingers 36 having stop members 40a that extend toward the body of the retainer 34.

An alternative, and as shown in FIG. 7, is to form the spring fingers 36a as curvilinear members that will provide the required outward camming action of the spring fingers upon insertion of the pipe 24.

Preferably the retainer 34 and its spring fingers are formed from a spring metal, as such as spring steel. Optionally, and for light load applications, the retainer 34 can be formed of a suitable hard but resilient plastics material.

The coupling 20 and the pipe 24 similarly can be manufacture from a metal, such as ductile iron or stainless steel, or equally well can be comprised of a suitable plastics material.

Further modifications will suggest themselves to persons skilled in the art that incorporate the basic concept of the present invention, that concept being of providing a retainer having spring fingers that extend radially inward of the coupling, and which, are deflected in a radially outward direction by insertion of a pipe into the coupling, the spring fingers then being restored their original position by the stored spring force and extending on a diameter less than the external diameter of the pipe.

What is claimed is:

1. A pipe coupling, which comprises:
    a) a tubular body having an inner opening and a generally transverse peripheral inner groove extending radially outwardly of said inner opening, said tubular body further having an aperture defined by at least one wall portion generally tangential to said inner groove, said aperture further being generally transverse to the central axis of said tubular body and communicating with said inner groove; and
    b) a retainer member having at least two ends, said retainer member positionable within said inner groove through said generally tangential aperture and having a band of resilient material, and a plurality of resilient fingers extending therefrom at an acute angle to said band, each said resilient finger terminating at a free end on a first diameter less than an internal diameter of said tubular body, and being deflectable generally radially outwardly to a second diameter greater than said first diameter.

2. The pipe coupling of claim 1, in which said retainer member is comprised of a spring steel.

3. The pipe coupling of claim 1, in which said retainer member is comprised of a hard and resilient plastics material.

4. The pipe coupling of claim 1, in which said fingers are provided on a longitudinal edge of said band of said resilient material.

5. The pipe coupling according to claim 4, in which said band is continuous between said two ends.

6. The pipe coupling of claim 5 in which each said spring finger terminates at a free end portion having a stop member extending generally perpendicular to said band.

7. The pipe coupling of claim 6, in which said stop members extend away from said band.

8. The pipe coupling of claim 6, in which said stop members extend toward said band.

9. The pipe coupling of claim 4, in which said free end portions of said spring fingers are curvilinear with respect to an axis perpendicular to said band.

10. The pipe coupling of claim 1, in combination with a pipe inserted into said tubular body, said pipe having a circumferential groove in the outer periphery thereof aligned with said inner groove in said inner opening of said tubular body, said spring fingers extending into said circumferential groove in said pipe, and being operative to engage said groove to prohibit withdrawal of said pipe from said tubular body in an axial direction.

11. The pipe coupling of claim 1, in which each said resilient finger is monolithic with said band.

12. A pipe coupling, which comprises:
   a) a tubular body having an inner opening having an internal diameter and a transverse peripheral inner groove extending radially outwardly of said inner opening, said tubular body further having an aperture which is generally tangential to said inner groove, said aperture further being generally transverse to the central axis of said tubular body and communicating with said inner groove; and
   b) a retainer member insertable into said tangential aperture so as to be positioned within said inner groove, said retainer member having a continuous band of resilient material, and a plurality of resilient fingers extending therefrom at an acute angle to said band, each said resilient finger being monolithic with said continuous band and terminating at a free end portion on a first diameter less than said internal diameter of said tubular body, and being deflectable radially outwardly to a second diameter greater than said first diameter, said free end portion having a stop member extending generally perpendicular to said band whereby a pipe inserted into said tubular body is prevented from withdrawal therefrom.

13. The pipe coupling of claim 12, in which said retainer member is comprised of a spring steel.

14. The pipe coupling of claim 12, in which said retainer member is comprised of a hard and resilient plastics material.

15. A pipe coupling, which comprises:
   a) a tubular body having an inner opening having an internal diameter and a generally transverse peripheral inner groove extending radially outwardly of said inner opening, said tubular body further having an aperture defined by at least one wall portion generally tangential to said inner groove, said aperture further being generally transverse to the central axis of said tubular body and communicating with said inner groove; and
   b) a retainer member positioned within said inner groove and removable through said generally tangential aperture, said retainer member having a band of resilient material, and a plurality of resilient fingers extending therefrom at a generally acute angle to said band, each said resilient finger having a generally arcuate cross-sectional configuration and being monolithic with said band and terminating at a free end portion on a first diameter less than said internal diameter of said tubular body inner opening, each said resilient finger further being deflectable generally radially outwardly to a second diameter greater than said first diameter.

16. The pipe coupling of claim 15, in which said retainer member is comprised of a hard and resilient plastics material.

17. The pipe coupling of claim 15, in which said retainer member is comprised of a spring steel.

18. A pipe coupling, which comprises:
   a) a tubular body having an inner opening and a transverse peripheral inner groove extending generally radially outwardly of said inner opening, said tubular body further having an aperture which is generally tangential to said inner groove, said aperture further being generally transverse to the central axis of said tubular body and communicating with said inner groove; and
   b) a retainer member positionable within said inner groove through said generally tangential opening and removable therefrom, said retainer member formed of a band of resilient material, at least a portion of said retainer member having a generally frusto-conical cross-sectional configuration such that one arcuate portion thereof is on a first diameter less than an internal diameter of said tubular body, and being deflectable radially outwardly to a second diameter greater than said first diameter.

19. A pipe coupling, which comprises:
   a) a tubular body defining a generally central axis and having an inner opening and a transverse peripheral inner groove extending generally radially outwardly of said inner opening, said tubular body further having an aperture defined by at least one wall portion generally tangential to said inner groove, said aperture further being generally transverse to the central axis of said tubular body and communicating with said inner groove;
   b) a flexible resilient retainer member having at least two ends, said retainer member being positionable in said peripheral inner groove by insertion of one end into said generally tangential aperture, at least a portion of said retainer member having a generally frusto-conical cross-sectional configuration when positioned in said inner groove whereby a first arcuate portion thereof has a first diameter less than a second arcuate portion and less than an internal diameter of said tubular body, said first arcuate portion being deflectable generally radially outwardly to a second diameter greater than said first diameter.

20. The pipe coupling of claim 19, in which said retainer member is comprised of a hard and resilient plastics material.

21. A pipe coupling, which comprises:
   a) a generally tubular body defining a generally central axis and having an inner opening and a generally transverse peripheral inner groove extending generally radially outwardly of said inner opening, said generally tubular body further having an aperture defined by at least one wall portion generally tangential to said inner groove and generally transverse to the generally central axis, said generally transverse aperture communicating with said inner groove; and b) a flexible, resilient, retainer member having at least two ends, said retainer member being positionable within said inner groove by insertion of at least one of said ends into said generally tangential aperture and removable from said inner groove by withdrawal thereof through said generally tangential aperture, at least a portion of said retainer member having a generally frusto-conical cross-sectional configuration such that one arcuate portion is on a first diameter less than an internal diameter of said tubular body, and being deflectable radially outwardly to a second diameter greater than said first diameter.

22. The pipe coupling of claim 21, in which said retainer member is comprised of a hard and resilient plastics material.

23. A pipe coupling, which comprises:
a) a generally tubular body defining a generally central axis and having an inner opening and a transverse peripheral inner groove extending generally radially outwardly of said inner opening, said tubular body further having an aperture which is generally tangential to said inner groove, said aperture being generally transverse to the central axis of said tubular body and communicating with said inner groove; and
b) a flexible retainer member having a band of resilient plastics material and at least two ends, said retainer member having a plurality of resilient fingers extending therefrom at an acute angle to said band, such that insertion of at least one end of said retainer member into said generally tangential aperture so as to position said retainer member within said inner groove causes said retainer member to assume a generally circular configuration corresponding to said inner groove, whereby at least portions of said resilient fingers assume a generally frusto-conical, cross-sectional configuration, said fingers each having a free end on a first diameter less than an internal diameter of said tubular body, and being deflectable radially outwardly to a second diameter greater than said first diameter.

24. The pipe coupling of claim 23, in which said retainer member is comprised of a hard and resilient plastics material.

25. A pipe coupling, which comprises:
a) a tubular body defining a generally central axis and having an inner longitudinal opening and a transverse peripheral inner groove extending radially outwardly of said inner opening, said tubular body further having an aperture which is generally tangential to said inner groove, said aperture further being generally transverse to the generally central axis of said tubular body and communicating with said inner groove; and
b) a flexible, resilient, retainer member having at least two ends, said retainer member being positionable within said inner groove by insertion of at least one end thereof into said generally tangential aperture such that said retainer member assumes a generally circular shape corresponding to the shape of said inner groove, at least a portion of said retainer member having a generally frusto-conical, cross-sectional configuration when positioned in said groove, at least one arcuate edge thereof being on a first diameter less than an internal diameter of said tubular body, and being resiliently deflectable radially outwardly to a second diameter greater than said first diameter.

26. The pipe coupling of claim 25, in which said retainer member is comprised of a hard and resilient plastics material.

27. A method of forming a pipe coupling, comprising:
a) taking a tubular body defining a generally central axis and having an inner opening and a transverse peripheral inner groove extending generally radially outwardly of said inner opening, said tubular body having an aperture which is generally tangential to said inner groove, said aperture further being generally transverse to the central axis of said tubular body, and communicating with said inner groove;
b) taking a flexible, resilient retainer member having at least two ends, at least a portion of said retainer member having a generally frusto-conical, cross-sectional configuration; and
c) inserting at least one of said ends of said retainer member into said generally tangential aperture so as to position said retainer member within said inner groove, such that at least one arcuate free edge is on a first diameter less than an internal diameter of said tubular body, and being deflectable radially outwardly to a second diameter greater than said first diameter.

28. The method according to claim 27 in which said flexible resilient retainer member is comprised of a hard and resilient plastics material.

\* \* \* \* \*